Nov. 5, 1963  H. MOORMANN  3,109,203
METHOD AND APPARATUS FOR MOLDING A DOLL'S HEAD
Filed March 9, 1961  3 Sheets-Sheet 1

INVENTOR.
HELMUTH MOORMANN
BY Amster & Levy
ATTORNEYS

Nov. 5, 1963   H. MOORMANN   3,109,203
METHOD AND APPARATUS FOR MOLDING A DOLL'S HEAD
Filed March 9, 1961   3 Sheets-Sheet 2

INVENTOR.
HELMUTH MOORMANN
BY
Amster + Levy
ATTORNEYS

Nov. 5, 1963    H. MOORMANN    3,109,203
METHOD AND APPARATUS FOR MOLDING A DOLL'S HEAD
Filed March 9, 1961    3 Sheets-Sheet 3
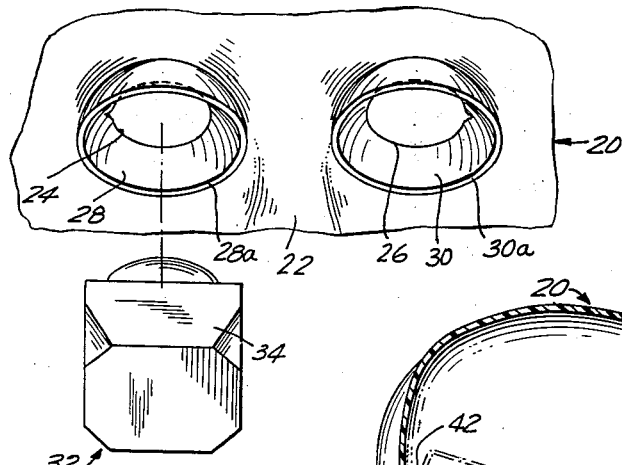
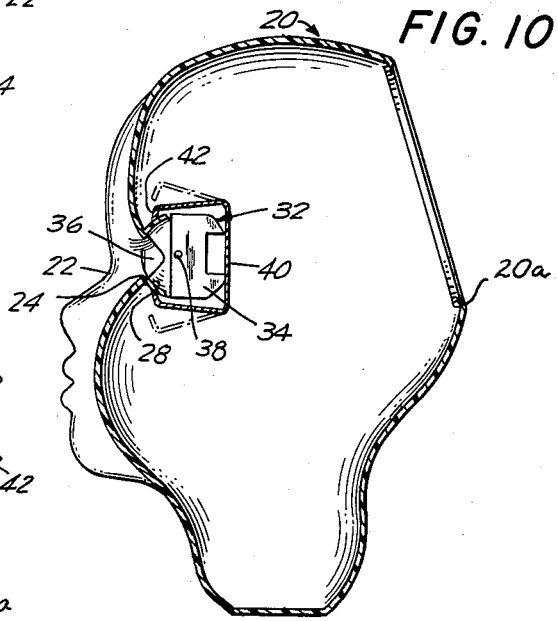
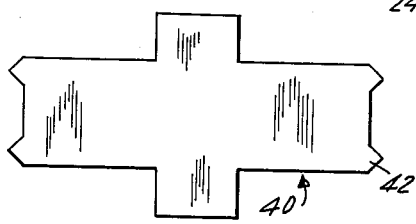
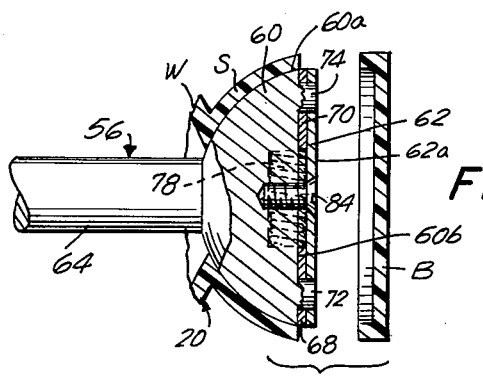
INVENTOR.
HELMUTH MOORMANN
BY Amster + Levy
ATTORNEYS United States Patent Office 3,109,203
Patented Nov. 5, 1963

3,109,203
METHOD AND APPARATUS FOR MOLDING A DOLL'S HEAD
Helmuth Moormann, Elmont, N.Y., assignor to Ideal Toy Corporation, Hollis, N.Y., a corporation of New York
Filed Mar. 9, 1961, Ser. No. 94,603
10 Claims. (Cl. 18—39)

The present invention relates generally to the molding of a doll's head, and in particular to an improved apparatus for the molding of a doll's head including eye openings bounded by inwardly projecting eyeball sockets, each of which is adapted to receive a pivoted eye assembly.

Heads for dolls are being manufactured on blow molding equipment in which a parison of an appropriate plastic is extruded between the front and rear mold sections of a two-section mold defining a cavity bounded by mold walls in the appropriate contour for the particular doll's head. After the extrusion of the parison, the front and rear mold sections are closed and the entrapped segment of the parison is blown to conform to the mold cavity. The resultant integral doll's head is then stripped from the mold and a skull or neck opening is cut therein to permit access to the interior of the head for further manufacturing operations including, without limitation, the rooting of hair into the scalp of the doll, the mounting of pivoted eye assemblies in the respective eye openings, the addition of tearing mechanisms, and the like.

With the advent of such blow molding technique for the manufacture of heads for dolls, there has developed the need for concurrent provision incident to molding of respective eye openings each bounded by an inwardly projecting semi-spherical eyeball socket. If this could be achieved, the subsequent mounting of respective eye assemblies in the thus formed eyeball sockets would become a relatively simple matter since the respective eye assemblies could be inserted through the skull or neck opening of the doll, seated in the respective sockets, and mounted in place by a relatively simple mechanical attachment.

Broadly, it is an object of the present invention to provide an improved apparatus for molding of the heads for dolls which realizes one or more of the aforesaid objectives. Specifically, it is within the contemplation of the present invention to provide an apparatus for molding a doll's head which includes eye openings at the opposite sides of the nose thereof, each of which is bounded by an inwardly projecting substantially semi-spherical eye-ball socket-forming wall of progressively increasing circular cross section.

In accordance with the present invention, there is provided a device for molding a doll's head including at least one eye opening bounded by an inwardly projecting eyeball socket-forming wall which comprises a mold having a mold wall defining an eye opening and an eye insert projecting inwardly of the mold wall and including an insert body of progressively increasing cross section from one end to the other. A shank projects from the one end of the insert body coaxially thereof and a cutter is provided adjacent the other end of the insert body. Provision is made for mounting the cutter on the insert body for movement outwardly in relation thereto and in response to rotation of the insert body and provision of a reaction force to the cutter. The mold is provided with a bearing extending inwardly from the mold wall which receives the shank for mounting the insert body for rotation. Appropriate drive means engage the shank when received in the bearing for rotating the insert body. The cutter projects beyond the insert body in an amount sufficient to be embedded in the socket-forming wall during molding. Accordingly, rotation of the insert body after molding is effective to develop the required reaction force to cause the cutter to move outwardly and cut through the molded socket-forming wall.

The above brief description, as well as further objects, features and advantages of the present invention will be best appreciated by reference to the following detailed description of a presently preferred, but nonetheless illustrative apparatus for the practice of the present invention, when taken in conjunction with the accompanying drawings, wherein:

FIG. 7 is an elevational view taken substantially along the line 7—7 of FIG. 6, with parts broken away and sectioned, further demonstrating cutting by the eye insert in accordance with the present invention;

FIG. 8 is a fragmentary perspective view taken internally of the doll's head and showing respective semi-spherical eyeball socket-forming walls formed at the opposite sides of the bridge of the nose of the doll's head in accordance with the present invention;

Figure 1:
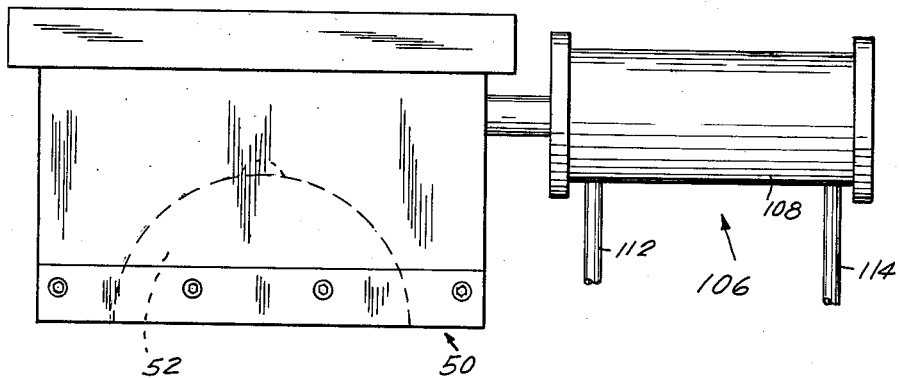
FIG. 1 is a top plan view of the front half section of a typical mold constructed in accordance with the present invention.

FIG. 9 is a plan view of a typical housing and mounting blank which may be enclosed about a commercially available doll's eye for mounting the same in the eye socket constructed according to the invention herein; and, FIG. 10 is a sectional view of a typical doll's head constructed in accordance with the present invention and incorporating a pivoted eye secured in place by the housing and mounting blank illustrated in FIG. 9.

Preliminary to referring to FIGS. 1 to 7 inclusive for a description of a typical apparatus in accordance with the present invention, reference will be made to FIGS. 8 to 10 inclusive for a description of a typical doll's head 20 which may be fabricated in accordance with the present invention. Specifically, the doll's head 20 includes a nose 22 having a bridge portion and respective eye openings 24, 26 at opposite sides thereof. The eye openings 24, 26 are bounded by inwardly projecting semi-spherical eyeball socket-forming walls 28, 30 of progressively increasing circular cross section. The respective socket-forming walls 28, 30 receive commercially available pivoted eye assemblies, such as the one illustrated at 32 for the left eye opening 24 and associated socket-forming wall 28. The pivoted eye assembly 32 includes a body 34 which receives an eyeball 36 projecting through the open front thereof. The eyeball 36 is pivotally mounted on the body 34 by pins 38 and opens and closes incident to the movement of the doll between an upright or sitting position and a horizontal or reclining position. In this illustrative arrangement, the pivoted eye assembly 32 is mounted within the doll's head 20, with the eyeball 36 thereof journalled in the eyeball socket 28 and visible through the eye opening 24 by the provision of a combined housing and mounting blank or stamping 40 which is of appropriate configuration to surround the body 34 (see FIG. 10). The blank 40 is provided with a number of prongs, such as illustrated at 42, which may be embedded within the socket-forming wall 28 to complete the mounting of the eye assembly 32 within the socket 28 and the corresponding eye opening 24. Although other mounting arrangements are within the contemplation of the present invention, it will be appreciated that the instant illustrative showing is typical of the relatively simple means which may be employed to mount conventional eye assemblies within a doll's head in accordance with the teachings herein.

Referring now to FIGS. 1 to 4 inclusive, there is shown a front mold section 50 formed with a front or face mold cavity section 52 which is bounded by mold wall 54 defining the desired features for the doll's face. The mold wall 54 includes regions, such as illustrated at 54a, defining or outlining eye openings (i.e. openings 24, 26 in FIG. 8). In accordance with the present invention, respective left and right eye inserts 56, 58 are mounted within the front mold cavity section 52 in the mold wall regions 54a defining the respective eye openings 24, 26. Since both the left and right eye inserts 56, 58 are of identical construction and are operated simultaneously in substantially the same manner, it will suffice to describe in detail only the left eye insert 56, shown in FIGS. 3 to 7 inclusive.

The left eye insert 56 includes an insert body 60 providing a semi-spherical molding surface 60a extending inwardly of the wall region 54a and flaring outwardly in relation to the eye opening 24 outlined or defined in the mold region 54a. The insert body 60 is bridged at its inner or larger diameter end by a circular cover plate 62 which provides a substantially planar molding surface 62a extending substantially at right angles to the axis of symmetry of the semi-spherical molding surface 60a. A circular shank 64 projects from the opposite or smaller diameter end of the insert body 60 and terminates at its free end in a forked coupling head 66. As will be described, the forked coupling head 66 is engaged to rotate the insert 56 about its axis of symmetry.

Interposed between the cover plate 62 and the inner planar face 60b of the insert body 60 are a pair of cutter blades 68, 70 which are pivoted on respective pins 72, 74 in the insert body 60 for pivotal movement in a cutting plane substantially parallel to the respective planar surfaces 60b, 62a of the insert body 60 and the cover plate 62. The pivoted cutter blade 68, 70 terminate in projecting cutter tips or points 68a, 70a which projects beyond the semi-spherical molding surface 60a of the insert body 60 such as to be embedded within the contiguous walls of the doll's head during the subsequent molding operation, as will be described. The cutter blades 68, 70 are biased into the illustrated positions in FIG. 5 through the provision of respective coil biasing springs 76, 78 which are received in confining sockets 80, 82 opening into the adjacent planar surface 60b of the insert body 60.

The cover plate 62 is secured in covering relation to the respective pivoted cutter blade 68, 70, except for the projecting cutter tips 68a, 70a, thereof, by an axially disposed machine screw 84 received within an appropriate countersunk opening centrally of the cover plate 62 and a threaded shank received within an appropriate tapped hole extending along the axis of symmetry of the insert body 60 inwardly from the planar face 60b thereof. The respective pivot pins 72, 74 for the cutter blade 68, 70 are received in corresponding openings provided in the cover plate 62.

Figure 3:
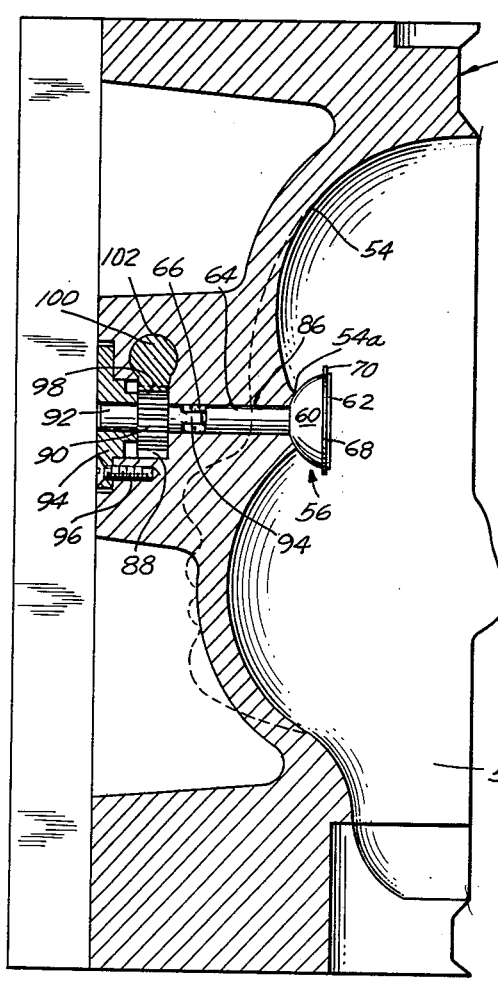
FIG. 3 is an enlarged sectional view taken along the front mold section showing the outline of the front or face half of the mold cavity and the mounting and actuation of the eye inserts in accordance with the present invention.
Figure 4:
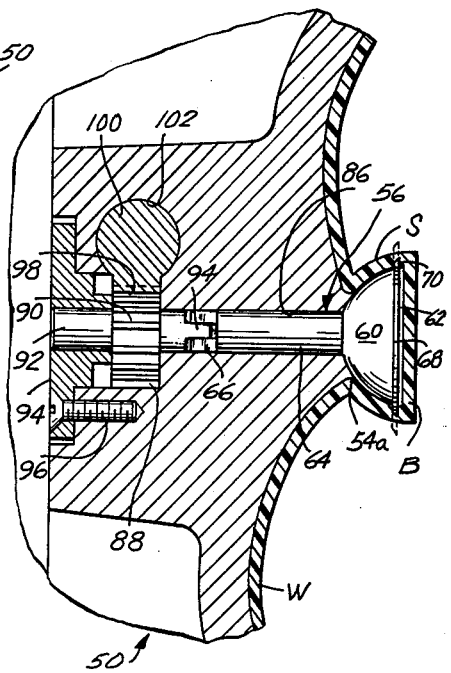
FIG. 4 is an enlarged fragmentary sectional view similar to FIG. 3, but shown after the molding of a doll's head within the mold cavity and about the illustrated eye insert.
Figure 5:
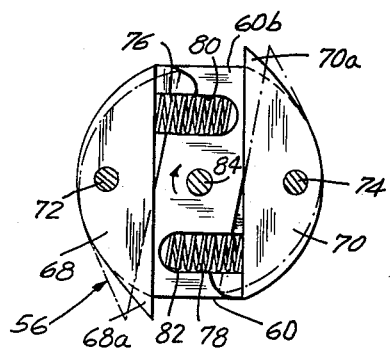
FIG. 5 is an end elevational view of the eye insert, with the cover plate thereof removed and taken substantially in the cutting plane, to illustrate the construction and mounting of the respective cutter blade.
Figure 6:
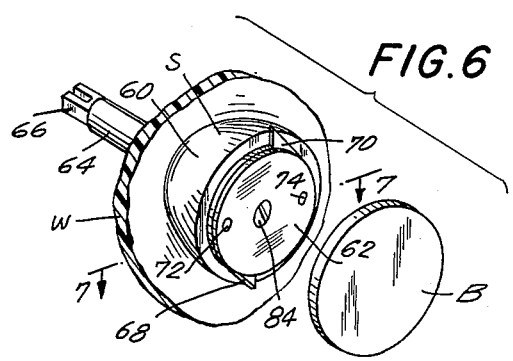
FIG. 6 is a perspective view after molding, with a part of the mold and doll's head removed for clarity, illustrating cutting by the eye insert.

The shank 64 of the eye insert 56 is journalled in an appropriate bearing opening 86 formed in the front mold section 20. The bearing opening 86 has an entry end leading into the wall region 54a which ultimately defines the associated eye openings. Accordingly, and as seen in FIGS. 3 and 4, the respective eye insert 56, 58 may be rotatably mounted within the mold cavity 52, with the semi-spherical molding surfaces thereof flaring outwardly in relation to the regions 54a and effectively providing a continuation of the cavity-forming wall 54 during the subsequent molding operation.

The bearing opening 86 for the shank 64 of the eye insert 56 opens into an appropriate chamber or cutout 88 formed in the front mold section 20 which receives a driving pinion 90 carried on an associated stub shaft 92. As seen in FIGS. 3 and 4, the stub shaft 92 is in end to end alignment with the shank 64 for the eye insert 56 and terminates at its inner end in an ear 94 which is received within the forked coupling head 66 on the terminal end of the shank 86. The driving pinion 90 is confined within the chamber 88 and the stub shaft 92 is appropriately journalled by a back-up plate 94 which straddles and closes the chamber 88 and is secured to the mold section by one or more machine screws or bolts 96. In response to rotation of the stub shafts 92, it will be appreciated that rotary movement will be imparted to the shank 64 via the separable couplings 66, 94 and to the eye insert 56. In like fashion, rotary motion is imparted to the eye insert 58.

Figure 2:
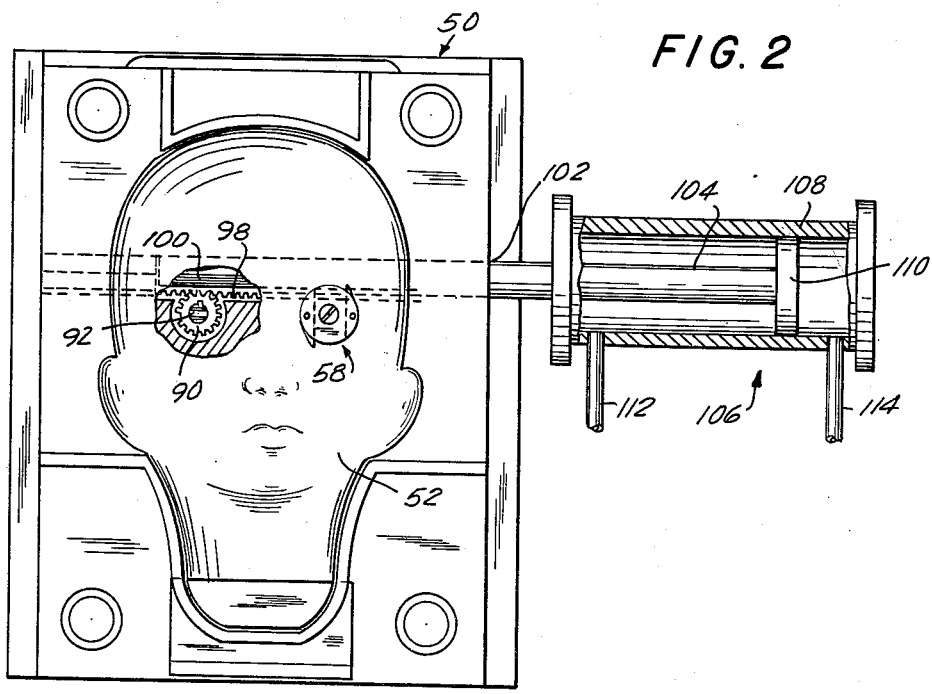
FIG. 2 is an inside elevational view, with parts broken away and sectioned, showing eye inserts constructed according to the present invention incorporated into the front mold section and rotatable by a double-acting piston and cylinder.

The driving pinions 90 are simultaneously rotated in this illustrative embodiment by the provision of a rack 98 which engages both driving pinions 90. The rack 98 is carried by an actuating shaft 100 which is mounted for reciprocation in the corresponding bore 102 formed in the front cavity section 20. The actuating shaft 100 is an integral extension of a piston rod 104 of a double-acting piston and cylinder assembly, generally designated by the reference numeral 106. As seen in FIG. 2, the piston rod extends into the cylinder 108 of the assembly 106 and carries a piston head 110 which may be selectively driven to the left or the right by introducing air into the corresponding chambers to the left and right of the piston head 110 via the inlet hoses 112, 114 and appropriate porting arrangements. As is generally understood, the double-acting piston and cylinder assembly 106 and other comparable pneumatic devices may be readily incorporated into the automatic controls for the molding equipment such that during the appropriate time in the molding cycle, the piston rod 104 and actuating shaft 100 may be driven through its operative stroke (towards the left in FIG. 2) to impart the requisite motion to the driving pinions 90 rotating the respective eye inserts 56, 58. In response to such rotation, the cutting tips or extensions 68a, 70a of the cutter blade 68, 70, which are embedded in the walls of the doll's head during molding, are rotated. Due to the reaction force so developed, the respective blades 68, 60 will move outwardly in the cutting plane to cut through the corresponding portion of the socket-forming wall such that the excess portions thereof molded about the cover plate 62 will be trimmed away. This leaves the respective socket-forming walls 28, 30 integral with the remaining walls of the doll's head 20 and forms corresponding entry openings 28a, 30a.

In order to facilitate a more thorough understanding of the present invention, a typical sequence of operations will be described:

At the start of a molding cycle, the respective eye insert 56, 58 are inserted into the bearings 86 in the regions 54a which outline the eye openings 24, 26. The molding operation is allowed to proceed in the usual fashion such that a wall W of polyethylene or other appropriate plastic is built up in contact with the cavity wall 54 and surrounding the respective eye inserts 56, 58. As a result of such molding operation, there will be built up about the semi-spherical bodies of the eye inserts corresponding semi-spherical eyeball socket-forming walls, designated by the letter S in FIGS. 4, 6 and 7, which walls are closed at their inner ends by transverse bases B. The transverse bases B represent excess or waste materials which must be cut away to provide the respective eye-inserting openings 28a, 30a for the sockets 28, 30. After the normal molding cycle is completed, the double-acting piston and cylinder 106 is operated to drive the rack 98 through its actuating stroke. This in turn will cause the respective cutter tips 68a, 70a, which had previously been embedded at the requisite locations, to swing outwardly incident to the reaction force developed by the rotation of the eye inserts 56, 58 with the tips of the cutter blades embedded in the molded walls. Thereupon, the blades will cut through the molded walls, as may be appreciated by inspecting the full and broken line showings of FIGS. 4 and 5 and the perspective showing of FIG. 6. Once the transverse bases or excess portions B are cut away, the respective cutter blades will return to their normal positions under the influence of the biasing springs 76, 78 and the molded doll head may be then stripped from the cavity of the front mold section 50. Incident to the stripping of the doll's head 20 from the front mold section 50, the eye inserts 56, 58 are carried away with the doll's head. It will be appreciated that this is readily possible in that the shanks 64 of the eye inserts 56, 58 are releasably coupled to the stub shafts 92 of the driving pinions 90. Thereupon, a skull opening 20a is cut into the doll's head 20 to facilitate the removal of the eye inserts 56, 58 from within the respective sockets and the subsequent eye assembly operations as detailed in conjunction with the description of FIG. 8 to 10 inclusive. It will be appreciated that there has been provided in accordance with the present invention, a relatively simple apparatus and method for the integral formation of eye sockets internally of a doll's head and the molding of corresponding eye openings. The invention herein may be readily practiced by very simple modifications of conventional molds and by the addition and mounting of eye inserts therein constructed in accordance with present invention.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

What I claim is:

1. Apparatus for molding a doll head including at least one eye opening bounded by an inwardly projecting eyeball socket-forming wall comprising a mold having a mold wall defining said eye opening, an eye socket forming insert including an insert body, a shank projecting from said insert body, a cutter on said insert body and operative in a prescribed plane, means mounting said cutter on said insert body for movement outwardly in relation thereto in response to rotation of said insert body, and provision of a reaction force to said cutter and bearing means in said mold extending inwardly from said mold wall and receiving said shank for mounting said insert body for rotation.

2. Apparatus for molding a doll head including at least one eye opening bounded by an inwardly projecting eyeball socket-forming wall comprising a mold having a mold wall defining said eye opening, an eye socket forming insert including an insert body, a shank projecting from said insert body, a cutter on said insert body and operative in a prescribed cutting plane, means mounting said cutter on said insert body for movement outwardly in relation thereto in response to rotation of said insert body and provision of a reaction force to said cutter, bearing means in said mold extending inwardly from said mold wall and receiving said shank for mounting said insert body for rotation, and means in said mold for engaging said shank when received within said bearing means for rotating said insert body, said cutter projecting beyond said insert body in an amount sufficient to be embedded in said socket-forming wall during molding, rotation of said insert body after molding causing said cutter to move outwardly and to cut through said socket-forming wall.

3. Apparatus for molding a doll head including at least one eye opening bounded by an inwardly projecting eyeball socket-forming wall of progressively increasing cross-section comprising a mold having a mold wall defining said eye opening, an eye socket forming insert including an insert body of progressively increasing cross-section from one end to the other end thereof, a shank projecting from said one end of said insert body coaxially thereof, a cutter adjacent said other end of said insert body and operative in a prescribed cutting plane, means mounting said cutter on said insert body for movement outwardly in relation thereto in response to rotation of said insert body and provision of a reaction force to said cutter, bearing means in said mold extending inwardly from said mold wall and receiving said shank for mounting said insert body for rotation, and means in said mold for engaging said shank when received within said bearing means for rotating said insert body, said cutter projecting beyond said insert body in an amount sufficient to be embedded in said socket-forming wall during molding, rotation of said insert body after molding being effective to develop said reaction force thereby causing said cutter to move outwardly and to cut through said socket-forming wall.

4. Apparatus for molding a doll head having eye openings bounded by inwardly projecting semi-spherical eyeball socket-forming walls of progressively increasing circular cross-section comprising a mold having mold walls defining said eye openings, an eye socket forming insert in each of said mold walls and each including an insert body of progressively increasing circular cross-section from one end to the other end thereof, a shank projecting from said one end of said insert body coaxial with the axis of symmetry thereof, a cutter adjacent said other end of said insert body and operative in a cutting plane at right angles to said axis of symmetry, and means mounting said cutter on said insert body for movement outwardly in relation thereto in response to rotation of said insert body about said axis of symmetry and provision of a reaction force to said cutter, bearing means in said mold extending inwardly from said mold walls and receiving said shanks for mounting said insert bodies for rotation about their respective axes of symmetry, and means in said mold for engaging said shanks when received within said bearing means for rotating said insert bodies, said cutters projecting beyond the respective insert bodies, in an amount sufficient to be embedded in said socket-forming walls during molding, rotation of said insert bodies after molding being effective to develop respective reaction forces thereby causing said cutters to cut through said socket-forming walls and cut away unwanted wall portions.

5. An eye socket forming insert including an insert body, a shank projecting from said insert body, a cutter on said insert body operative in a prescribed cutting plane, and means mounting said cutter on said insert body for movement outwardly in relation thereto in response to rotation of said insert body and provision of a reaction force to said cutter, said cutter projecting beyond said insert body in an amount sufficient to be embedded in a socket-forming wall formed about said eye socket forming insert during molding.

6. An eye socket forming insert including an insert body of progressively increasing circular cross-section from one end to the other end thereof, a shank projecting from said one end of said insert body coaxial with the axis of symmetry thereof, a cutter adjacent said other end of said insert body and operative in a cutting plane at right angles to said axis of symmetry, and means mounting said cutter on said insert body for movement outwardly in relation thereto in response to rotation of said insert body about said axis of symmetry and provision of a reaction force to said cutter, said cutter projecting beyond said insert body in an amount sufficient to be embedded in a socket-forming wall formed about said eye socket forming insert during molding, rotation of said insert body with said cutter embedded being effective to develop said reaction force thereby causing said cutter to cut through said socket-forming wall.

7. An eye socket forming insert comprising an insert body having a semi-spherical molding surface and a substantially planar molding surface at its inner end extending at right angles to the axis of symmetry of said semi-spherical molding surface, a shank connected to said insert body for mounting said insert body for rotation about said axis of symmetry, at least one cutter blade extending radially of and within said insert body inwardly of said planar molding surface, and means mounting said cutter blade for outward movement in a cutting plane parallel to and adjacent said planar molding surface in response to rotation of said insert body and provision of a reaction force, said cutter blade normally extending beyond said semi-spherical mold surface such as to be embedded in a socket wall incident to molding.

8. In a mold, a front mold section having a mold wall region defining an eye opening, an eye socket forming insert including an insert body providing a semi-spherical molding surface extending inwardly of said wall region and flaring outwardly in relation to said eye opening, said body having a substantially planar molding surface at its inner end extending at right angles to the axis of symmetry of said semi-spherical molding surface, said molding surfaces adapted to have built up thereon during molding a semi-spherical eyeball socket wall projecting inwardly from said eye opening and closed at its inner end by a transverse base, means projecting through said wall region and mounting said insert body for rotation about said axis of symmetry, at least one cutter blade on said insert body inwardly of said planar molding surface, and means mounting said cutter blade for outward movement in a cutting plane adjacent said planar molding surface in response to rotation of said insert body and provision of a reaction force, said cutter blade normally extending beyond said semi-spherical molding surface such as to be embedded in said socket wall contiguous to said transverse base incident to molding.

9. In a mold, a front mold section having a mold wall region defining an eye opening, an eye socket forming insert including an insert body providing an outwardly flaring molding surface extending inwardly of said wall region, said body having a transverse molding surface at its inner end, said molding surfaces adapted to have built up thereon during molding an eyeball socket wall projecting inwardly from said eye opening and closed at its inner end by a transverse base which may be cut away such as to permit the assembly of an eye within said socket wall, a shank projecting through said wall region mounting said insert body for rotation, at least one cutter blade extending radially of and within said insert body inwardly of said transverse molding surface, means mounting said cutter blade for outward movement in a cutting plane adjacent to said transverse molding surface, said cutter blade normally extending beyond said flaring molding surface such as to be embedded in said socket wall contiguous to said transverse base incident to molding, and means operatively connected to said shank for rotating said insert body after molding to cause said cutter blade to move outwardly and to cut through said socket wall contiguous to said transverse base.

10. In a mold including a front mold section having a mold wall region defining an eye opening, the improvement comprising an eye socket forming insert including an insert body providing a semi-spherical molding surface extending inwardly of said wall region and flaring outwardly in relation to said eye opening, said body having a substantially planar molding surface at its inner end extending at right angles to the axis of symmetry of said semi-spherical molding surface, said molding surfaces adapted to have built up thereon during molding a semi-spherical eyeball socket wall projecting inwardly from said eye opening and closed at its inner end by a transverse base which may be cut away such as to permit the assembly of an eye within said socket wall, a shank projecting through said wall region mounting said insert body for rotation about said axis of symmetry, at least one cutter blade extending radially of and within said insert body inwardly of said planar molding surface, means mounting said cutter blade for outward movement in a cutting plane parallel to and adjacent said planar molding surface, said cutter blade normally extending beyond said semi-spherical mold surface such as to be embedded in said socket wall contiguous to said transverse base incident to molding, and means operatively connected to said shank for rotating said insert body about said axis of symmetry after molding to cause said cutter blade to move outwardly and to cut through said socket wall contiguous to said base to cut away said base.

References Cited in the file of this patent
UNITED STATES PATENTS

| | | |
|---|---|---|
| 2,728,948 | Kallus | Jan. 3, 1956 |
| 2,862,232 | Rekettye | Dec. 2, 1958 |
| 2,936,493 | Scherer | May 17, 1960 |
| 3,015,856 | Cohn | Jan. 9, 1962 |

FOREIGN PATENTS

| | | |
|---|---|---|
| 698,537 | Great Britain | Oct. 14, 1953 |